US011947444B2

(12) United States Patent
Copty et al.

(10) Patent No.: US 11,947,444 B2
(45) Date of Patent: Apr. 2, 2024

(54) SHARING INSIGHTS BETWEEN PRE AND POST DEPLOYMENT TO ENHANCE CLOUD WORKLOAD SECURITY

(71) Applicant: International Business Machines Corporation, Armonk, NY (US)

(72) Inventors: Fady Copty, Nazareth (IL); Omri Soceanu, Haifa (IL); Gilad Ezov, Nesher (IL); Ronen Levy, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 17/091,386

(22) Filed: Nov. 6, 2020

(65) Prior Publication Data

US 2022/0147635 A1 May 12, 2022

(51) Int. Cl.
*G06F 11/36* (2006.01)
*G06F 8/71* (2018.01)

(52) U.S. Cl.
CPC ............ *G06F 11/3636* (2013.01); *G06F 8/71* (2013.01); *G06F 11/3612* (2013.01); *G06F 11/3616* (2013.01)

(58) Field of Classification Search
None
See application file for complete search history.

(56) References Cited

U.S. PATENT DOCUMENTS 8,418,251 B1    4/2013  Satish
9,606,906 B1 *  3/2017  Van Nostrand ..... G06F 11/3684
(Continued)

FOREIGN PATENT DOCUMENTS

CN    104144063 A    8/2018
JP    2016192185 A   11/2016
WO    2018233638 A1  12/2018

OTHER PUBLICATIONS

Aggarwal et al., "Integrating Static and Dynamic Analysis for Detecting Vulnerabilities," IEEE 30th Annual International Computer Software & Applications Conference (COMPSAC'06), doi: 10.1109/COMPSAC.2006.55, pp. 1-8.

(Continued)

*Primary Examiner* — Qing Chen
(74) *Attorney, Agent, or Firm* — Stephanie L. Carusillo (57) ABSTRACT

Embodiments may provide techniques that may provide more accurate and actionable alerts by cloud workload security systems so as to improve overall cloud workload security. For example, in an embodiment, a method may be implemented in a computer system comprising a processor, memory accessible by the processor, and computer program instructions stored in the memory and executable by the processor, and the method may comprise generating performance and security information relating to a software system during development of the software system, generating performance and security information relating to the software system during deployed operation of the software system, matching the performance and security information generated during development of the software system with the performance and security information generated during deployed operation of the software system to determine performance and security alerts to escalate, and reporting the escalated performance and security alerts.

20 Claims, 3 Drawing Sheets

(56) References Cited

U.S. PATENT DOCUMENTS

| | | | | |
|---|---|---|---|---|
| 9,928,055 | B1* | 3/2018 | Douberley | H04B 7/2628 |
| 10,447,525 | B2 | 10/2019 | Patrich | |
| 2008/0086660 | A1* | 4/2008 | Wefers | G06F 11/3688 |
| | | | | 714/E11.219 |
| 2012/0060173 | A1* | 3/2012 | Malnati | G06F 11/3072 |
| | | | | 719/318 |
| 2017/0076106 | A1 | 3/2017 | Keidar | |
| 2019/0005542 | A1 | 1/2019 | Goldshtein | |
| 2019/0114246 | A1* | 4/2019 | Sexton | G06F 11/3664 |
| 2020/0028862 | A1 | 1/2020 | Lin | |
| 2020/0160230 | A1 | 5/2020 | Wang | |

OTHER PUBLICATIONS

Cloud smart alert correlation in Azure Security Center (incidents), Jul. 2, 2019, pp. 1-2, <https:docs.microsoft.com/en-us/azure/security-center/security-center-alerts-cloud-smart>.

Datadog, "Application Log Management & Analytics", Accessed on Sep. 21, 2020, pp. 1-8, <https://www.datadoghq.com/dg/logs/application>.

Disclosed Anonymously et al., "Feedback-Based Automatic Anomaly Detection for Cloud Platforms", ip.com Prior Art Database Technical Disclosure, IPCOM000260742D, Dec. 18, 2019, pp. 1-4.

Halfond et al., "Combining Static Analysis and Runtime Monitoring to Counter SQL-Injection Attacks", © 2005 ACM ISBN #1-59593-126-0,<https://www.cc.gatech.edu/home/orso/papers/halfond.orso.WODA0.pdf>.

McCurdy., "CWPP Security 101", Cloud Workload Protection Platform Security 101/Gartner Market Guide Apr. 16, 2020, pp. 1-9, <https://www.lacework.com/cloud-workload-protection-insights/>.

Riley., DevOps.com, "Why Workload Security Is Not Just for IT Anymore", Jun. 6, 2019, pp. 1-2.

"Patent Cooperation Treaty PCT International Search Report", Applicant's File Reference: P202001116, International Application No. PCT /IB2021/059855, International Filing Date: Oct. 26, 2021, dated Jan. 28, 2022, 6 pages.

* cited by examiner

SHARING INSIGHTS BETWEEN PRE AND POST DEPLOYMENT TO ENHANCE CLOUD WORKLOAD SECURITY

BACKGROUND

The present invention relates to techniques that may provide more accurate and actionable alerts by cloud workload security systems so as to improve overall cloud workload security.

Cloud workload security is one of the fastest growing security concerns today. Run time workload security systems often produce alerts with a high false positive rate. The high false positive rate may cause systems to ignore many positive alerts, and thus, miss some true-positives. As a result, many attacks may evade the security defenses. Also, pre-deployment security testing may suffer from the same problem and true-positives (valid alerts) may sometimes be ignored and/or not validated due to the high amount of false positive alerts in pre-deployment security testing.

Accordingly, a need arises for techniques that may provide more accurate and actionable alerts by cloud workload security systems so as to improve overall cloud workload security.

SUMMARY

Embodiments may provide techniques that may provide more accurate and actionable alerts by cloud workload security systems so as to improve overall cloud workload security.

Embodiments may combine development testing (pre-deployment) and runtime (post-deployment) monitoring of cloud software systems, thereby sharing insights between pre and post deployment software environments to provide more accurate and actionable alerts. For example, processes such as application log analysis may be used for sharing insights. Likewise, call graphs may be used for local-log-sequence sharing. Further, error handling may be used as an indication for security weaknesses.

For example, in an embodiment, a method may be implemented in a computer system comprising a processor, memory accessible by the processor, and computer program instructions stored in the memory and executable by the processor, and the method may comprise generating performance and security information relating to a software system during development of the software system, generating performance and security information relating to the software system during deployed operation of the software system, matching the performance and security information generated during development of the software system with the performance and security information generated during deployed operation of the software system to determine performance and security alerts to escalate, and reporting the escalated performance and security alerts.

In embodiments, generating performance and security information relating to a software system during development of the software system may comprise at least one of performing static and dynamic testing of code of the software system during development of the software system to collect a history of alerts generated during the testing, performing dynamic testing of subsystems of code of the software system during development of the software system to generate application logs for produced alerts, and performing dynamic testing of units of code of the software system during development of the software system to generate error-handling logs for produced alerts. The method may further comprise associating each generated alert with an immediate log-sequence using generated call graphs representing calling relationships between routines in the software system. Generating performance and security information relating to the software system during deployed operation of the software system may comprise monitoring deployed operation of the software and collecting alerts produced by the monitoring. Generating performance and security information relating to the software system during deployed operation of the software system may comprise collecting information regarding configuration changes and/or alerts regarding configuration changes and the matching comprises matching the collected information regarding configuration changes and/or alerts regarding configuration changes with the performance and security information generated during deployed operation of the software system to determine performance and security alerts to escalate. Matching the performance and security information generated during development of the software system with the performance and security information generated during deployed operation of the software system may comprise determining a root cause of an alert produced by the monitoring using the history of alerts generated during the testing and when a root cause of an alert produced by the monitoring matches a recent alert in the history of alerts generated during the testing, escalating the alert produced by the monitoring or of both the alert produced by the monitoring and the alert in history of alerts generated during the testing. Matching the root cause of an alert produced by the monitoring with a recent alert in the history of alerts may be based on similar log-sequences or log-groups and may be performed using machine learning techniques. Matching the performance and security information generated during development of the software system with the performance and security information generated during deployed operation of the software system further may comprise matching the root cause of an alert produced by the monitoring with a recent alert in the history of alerts based on similar log-sequences or log-groups and is performed using machine learning techniques, matching unit-test error handling logs of alerts generated during the testing with alerts produced by the monitoring by examining application logs using a recent time window, searching for matches with known log-signatures of problems, and upon finding at least one match, escalating a severity of the alert produced by the monitoring and associating information relating to the alerts produced by the monitoring with source code causing the alerts generated during the testing.

In an embodiment, a system may comprise a processor, memory accessible by the processor, and computer program instructions stored in the memory and executable by the processor to perform generating performance and security information relating to a software system during development of the software system, generating performance and security information relating to the software system during deployed operation of the software system, matching the performance and security information generated during development of the software system with the performance and security information generated during deployed operation of the software system to determine performance and security alerts to escalate, and reporting the escalated performance and security alerts.

In an embodiment, a computer program product may comprise a non-transitory computer readable storage having program instructions embodied therewith, the program instructions executable by a computer, to cause the computer to perform a method comprising generating performance and security information relating to a software system during development of the software system, generating performance and security information relating to the software system during deployed operation of the software system, matching the performance and security information generated during development of the software system with the performance and security information generated during deployed operation of the software system to determine performance and security alerts to escalate, and reporting the escalated performance and security alerts.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide techniques that may provide more accurate and actionable alerts by cloud workload security systems so as to improve overall cloud workload security.

Embodiments may combine development testing (pre-deployment) and runtime (post-deployment) monitoring of cloud software systems, thereby sharing insights between pre and post deployment software environments to provide more accurate and actionable alerts. For example, processes such as application log analysis may be used for sharing insights. Likewise, call graphs may be used for local-log-sequence sharing. Further, error handling may be used as an indication for security weaknesses.

Continuous integration (CI) is a coding technique in which small changes to code may be implemented and frequently checked into version control repositories of version control systems. The allows CI to provide a consistent and automated way to build, package, and test applications. This allows more frequent commitment of code changes, which leads to better collaboration and software quality. Continuous delivery (CD) automates the delivery of applications to selected infrastructure environments. Most teams work with multiple environments other than the production, such as development and testing environments, and CD ensures there is an automated way to push code changes to them. Continuous Integration and Continuous Delivery (CI/CD) combines these two techniques into an integrated coding and testing workflow.

Figure 1:
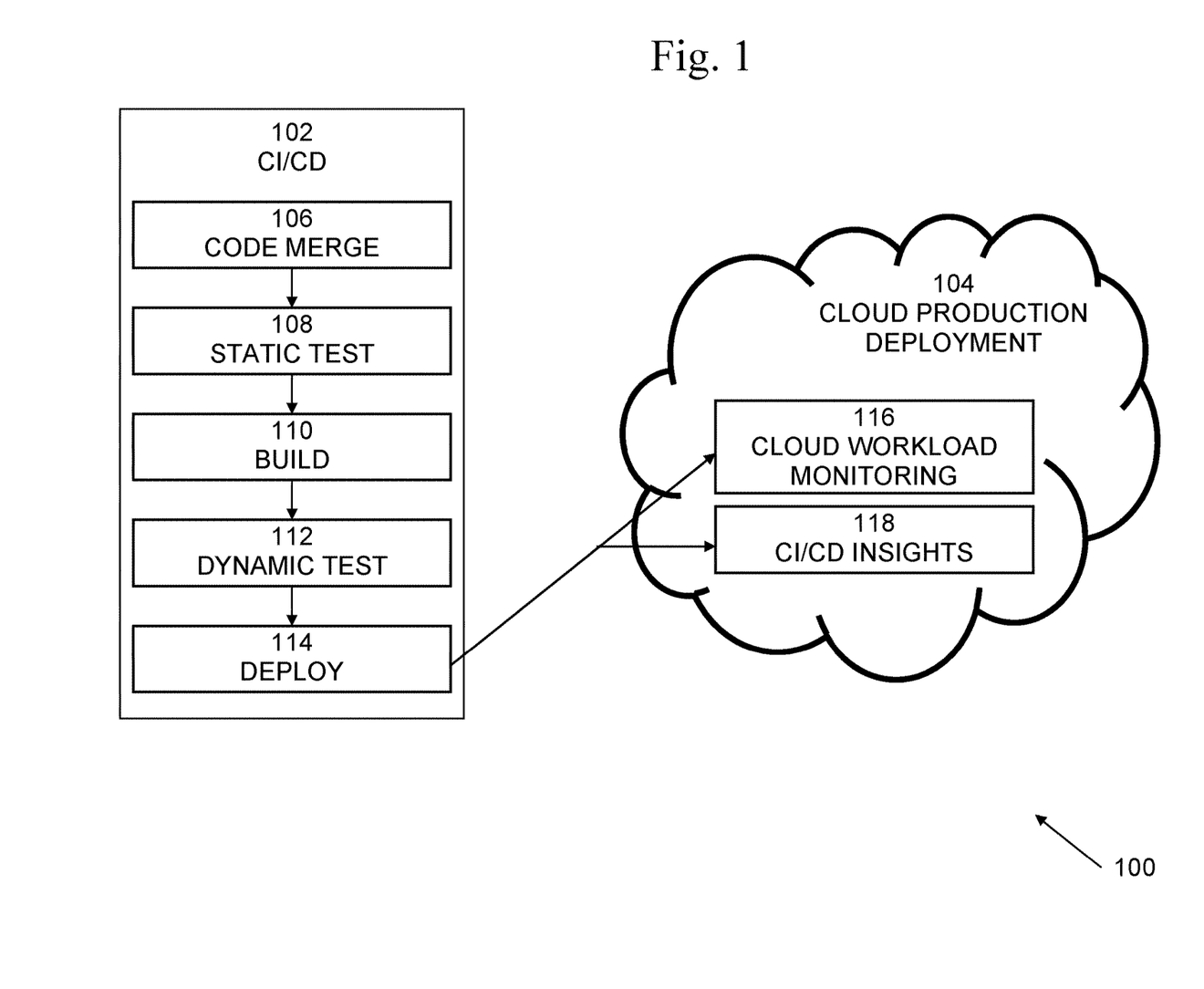
FIG. 1 illustrates an exemplary environment in which cloud workload applications may be developed, tested, and used in a production deployment according to embodiments of the present techniques.

An exemplary environment 100 in which cloud workload applications may be developed, tested, and used in a production deployment is shown in FIG. 1. In this example, environment 100 may include CI/CD development environment 102 and cloud production deployment 104. CI/CD development environment 102 may include processing blocks such as code merge block 106, static test block 108, build block 110, dynamic test block 112, and deployment block 114. Code merge block 106 may perform code merging (also called integration), which is an operation that reconciles multiple changes made to software source code files that are under version control. For example, if a file is modified on two independent branches, the different branches may be merged to form a single collection of files that contains all sets of changes. In embodiments, automatic merging may be performed by version control systems in CI/CD development environment 102 to reconciles changes that have happened simultaneously (in a logical sense). Manual merging may be performed, if necessary, if automatic merging is ineffective or inoperative.

Static test block 108 may perform testing and analysis of computer software without actually executing programs, for example, the merged version of the source code and/or object code output from code merge block 106. In embodiments, such analysis may be performed by an automated tool. Build block 110 may perform building of a complete application or software system, including compiling of source code to object code, linking of object code and library object code, as well as other software resources, etc., to form a set of code that can be executed. Dynamic test block 112 may perform analysis of computer software that is performed by executing programs on a real or virtual processor to monitor the actual behavior of the software in operation. Deployment block 114 may perform deployment of computer software, including, for example, generation of an installation package, allowing the software to easily be installed, as well as installation of the software, associated software that is required for operation, etc.

Cloud production deployment 104 may provide the environment for live, or production, operation of computer software applications and systems, and may provide the environment that users (people, client computers, other servers, etc.) may directly interact with. Cloud production deployment 104 may include cloud workload monitoring block 116 and CI/CD insights 118. Cloud workload monitoring block 116 may monitor the operation and workload parameters of the deployed software in cloud production deployment 104 and may generate alerts based on the monitored operation. CI/CD insights 118 may include information about the operation of the deployed software obtained from the CI/CD development environment 102, such as the alert history, and may be utilized by cloud workload monitoring block 116 to provide enhanced information about the operation of the deployed software cloud production deployment 104.

Figure 2:
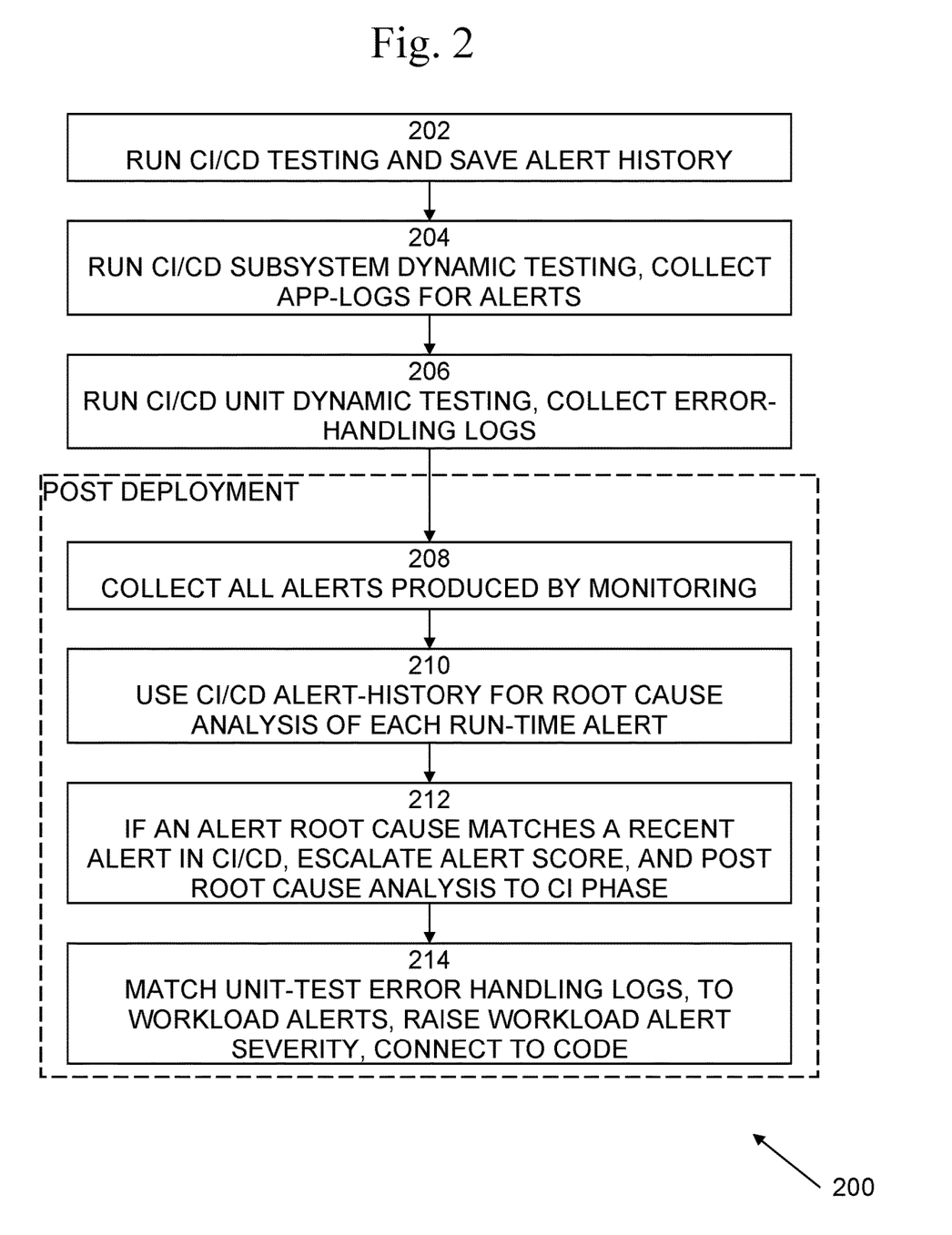
FIG. 2 is an exemplary flow diagram of a process of operation according to embodiments of the present techniques.

An exemplary process 200 of operation according to the present embodiments is shown in FIG. 2. It is best viewed in conjunction with FIG. 1. Process 200 begins with 202, in which, CI/CD testing may be performed and the alert history from such testing may be saved, for example, in CI/CD insights 118. Such CI/CD testing may include, for example, static testing, such as configuration tests and code tests performed by static test block 108, and dynamic testing performed by dynamic text block 112. During static testing, a call graph may be created to represent calling relationships between routines in the computer software. Every generated alert may be associated with its possible immediate log-sequence (limited steps) as documented in the call graph. At 204, CI/CD subsystem dynamic testing may be performed and application logs for the alerts produced may be collected. The collected application logs may be saved, for example, in CI/CD insights 118. At 206, CI/CD unit testing may be performed and error-handling logs, which may include sequences that indicate an unexpected control flow, may be collected. In addition, information regarding configuration changes and/or alerts regarding configuration changes may be collected. Further, the log-signatures of error-handling unit tests may be characterized. The collected error-handling logs and characterizations may be saved, for example, in CI/CD insights 118.

Once the software has been deployed to cloud production deployment 104, that is, post deployment, at 208, cloud workload monitoring block 116 may monitor the operation of cloud production deployment 104 and may collect all alerts produced by such monitoring. When such a workload alert occurs, the application logs may be examined, using a recent time window, to detect recent log anomalies. At 210, the CI/CD alert-history 118 may be used for root cause analysis of each workload alert. At 212, if a workload alert root cause matches a recent alert in CI/CD alert-history 118, the alert score of the workload alert or of both the workload alert and the alert in CI/CD alert-history 118 may be escalated, and the root cause analysis may be reported, for example, posted to the CI, for example, on github. For example, process 200 may connect to git commit based on code commit. That is, information relating to the alerts may be associated with the source code that was determined to be causing the alert in the version control system of the CI/CD development environment 102.

Matches between workload alerts and alerts found during static analysis (CI/CD alert-history 118) may be determined based on similar log-sequences (or log-groups). For example, matching techniques, which may include machine learning techniques, and may also include techniques such as One2one match, sequence alignment, DNA comparison, etc., may be used to determine the match. For example, the matching may be done via a DNN (deep neural network) classifier that trains and attempts to correlate static test results, configuration changes, git logs and configuration alert logs during the development stage and sequential application log data from the testing and initial deployment stages. These may then be temporally matched with alerts during runtime. At 214, unit-test error handling logs may be matched to workload alerts. Embodiments may perform such matching by examining application logs collected at 204 using a recent time window. Then, process 200 may search for matches with known log-signatures of problematic scenarios, at 206. Upon finding one or more such matches, the severity of the workload alert may be escalated or raised and may be reported, for example, by being connected to the code. That is, the information relating to the alerts may be associated with the source code that was determined to be causing the alert in the version control system of the CI/CD development environment 102. Further, alerts found at the post deployment stage may be matched with information regarding configuration changes and/or alerts regarding configuration changes that were collected during CI/CD testing.

Figure 3:
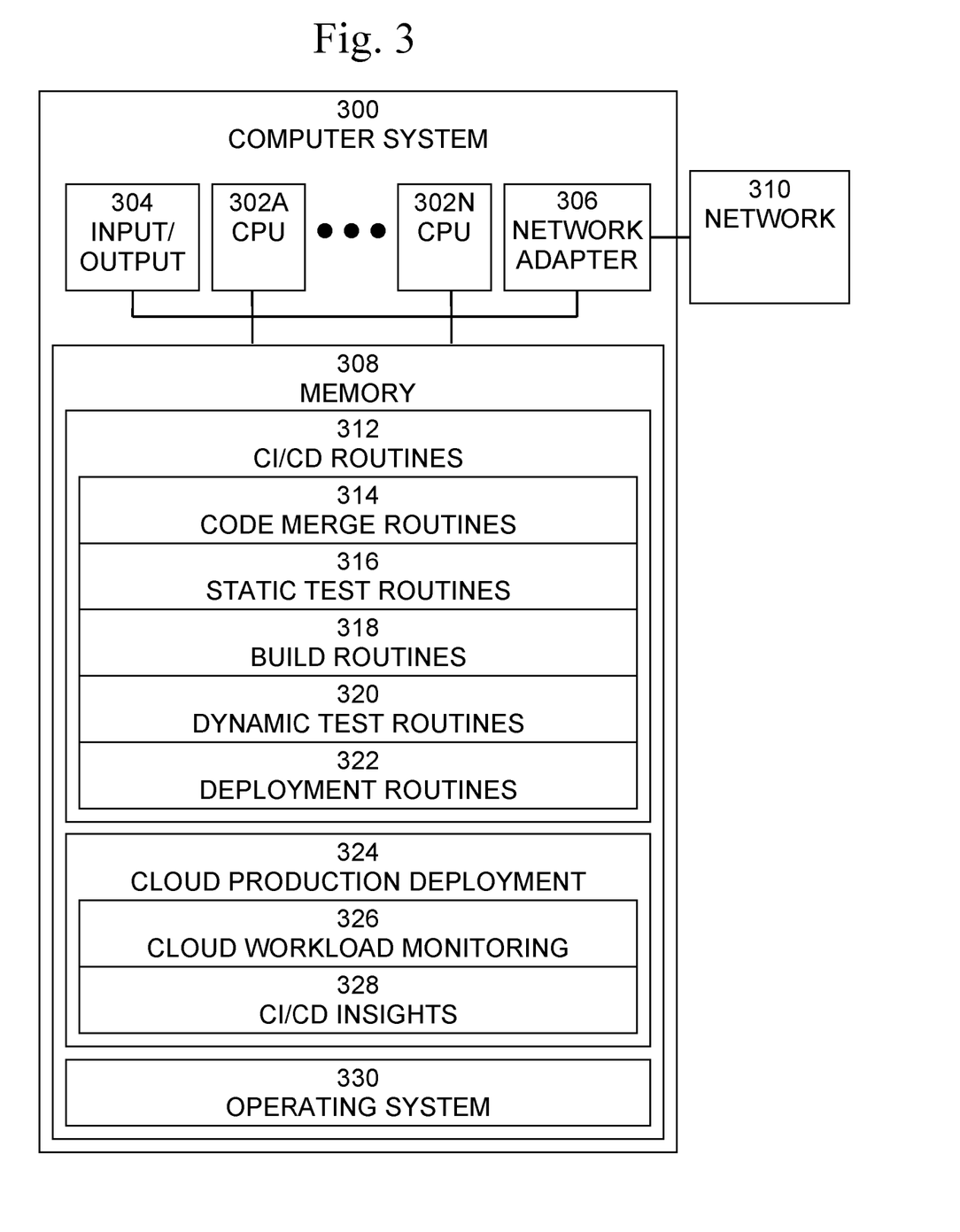
FIG. 3 is an exemplary block diagram of a computer system, in which processes involved in the embodiments described herein may be implemented.

An exemplary block diagram of a computer system 300, in which processes involved in the embodiments described herein may be implemented, is shown in FIG. 3. Computer system 300 may be implemented using one or more programmed general-purpose computer systems, such as embedded processors, systems on a chip, personal computers, workstations, server systems, and minicomputers or mainframe computers, or in distributed, networked computing environments. Computer system 300 may include one or more processors, CPUs 302A-302N, input/output circuitry 304, network adapter 306, and memory 308. CPUs 302A-302N execute program instructions in order to carry out the functions of the present communications systems and methods. Typically, CPUs 302A-302N are one or more microprocessors. FIG. 3 illustrates an embodiment in which computer system 300 is implemented as a single multi-processor computer system, in which multiple processors CPUs 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces computer system 300 with a network 310. Network 310 may be any public or proprietary LAN or WAN, including, but not limited to the Internet.

Memory 308 stores program instructions that are executed by, and data that are used and processed by, CPUs 302A-302N to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 3, memory 308 may include CI/CD routines 312, which may include code merge routines 314, static test routines 316, build routines 318, dynamic test routines 320, and deployment routines 322, and cloud production deployment 324, which may include cloud workload monitoring routines 326, CI/CD insights data 328, and operating system 330. CI/CD routines 312 may include software routines to implement CI/CD development environment 102, shown in FIG. 1, as described above. Code merge routines 314 may include software routines to perform code merging (also called integration), which is an operation that reconciles multiple changes made software source code files that are under version control, as described above. Static test routines 316 may include software routines to perform testing and analysis of computer software without actually executing programs, as described above. Build routines 318 may include software routines to perform building of a complete application or software system, including compiling of source code to object code, linking of object code and library object code, as well as other software resources, etc., to form a set of code that can be executed, as described above. Dynamic test routines 320 may include software routines to perform analysis of computer software that is performed by executing programs on a real or virtual processor to monitor the actual behavior of the software in operation, as described above. Deployment routines 322 may include software routines to perform deployment of computer software, including, for example, generation of an installation package, allowing the software to easily be installed, as well as installation of the software, associated software that is required for operation, etc., as described above. Cloud production deployment 324 may software routines to provide the environment for live, or production, operation of computer software applications and systems, and may provide the environment that users (people, client computers, other servers, etc.) may directly interact with, as described above. Cloud workload monitoring routines 326 may include software routines to perform monitor the operation and workload parameters of the deployed software in the cloud production deployment and may generate alerts based on the monitored operation, as described above. CI/CD insights data 328 may include information about the operation of the deployed software obtained from the CI/CD development environment 102, such as the alert history, and may be utilized to provide enhanced information about the operation of the deployed software cloud production deployment, as described above. Operating system 330 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, a memory accessible by the processor, and computer program instructions stored in the memory and executable by the processor, the method comprising:
   generating a first performance and security information relating to a software system during a development of the software system, wherein generating the first performance and security information relating to the software system during the development of the software system comprises performing a static and dynamic testing of code of the software system during the development of the software system to generate a history of one or more generated alerts;
   generating a second performance and security information relating to the software system during a deployed operation of the software system;
   matching the first performance and security information relating to the software system generated during the development of the software system with the second performance and security information relating to the software system generated during the deployed operation of the software system to determine one or more performance and security alerts to escalate; and
   reporting the one or more escalated performance and security alerts.

2. The method of claim 1, wherein generating the first performance and security information relating to the software system during the development of the software system further comprises at least one of:
   performing a first dynamic testing of one or more subsystems of code of the software system during the development of the software system to generate one or more application logs for the one or more generated alerts; and
   performing a second dynamic testing of one or more units of code of the software system during the development of the software system to generate one or more error-handling logs for the one or more generated alerts.

3. The method of claim 2, further comprising associating each generated alert of the one or more generated alerts with an immediate log-sequence using one or more generated call graphs representing one or more calling relationships between routines in the software system.

4. The method of claim 3, wherein generating the second performance and security information relating to the software system during the deployed operation of the software system comprises monitoring the deployed operation of the software system and collecting one or more monitor alerts produced by monitoring the deployed operation of the software system.

5. The method of claim 4, wherein generating the second performance and security information relating to the software system during the deployed operation of the software system comprises collecting at least one of an information regarding one or more configuration changes and one or more produced alerts regarding the one or more configuration changes and the matching comprises matching the collected information regarding at least one of the one or more configuration changes and the one or more produced alerts regarding the one or more configuration changes with the second performance and security information relating to the software system generated during the deployed operation of the software system to determine a performance and the one or more performance and security alerts to escalate.

6. The method of claim 4, wherein matching the first performance and security information relating to the software system generated during the development of the software system with the second performance and security information relating to the software system generated during the deployed operation of the software system to determine the one or more performance and security alerts to escalate comprises:

determining a root cause of an alert produced by monitoring the deployed operation of the software system using the history of one or more generated alerts generated during the static and dynamic testing of code of the software system; and     responsive to the root cause of the alert produced by monitoring the deployed operation of the software system matches a recent alert in the history of one or more generated alerts generated during the static and dynamic testing of code of the software system, escalating the alert produced by monitoring the deployed operation of the software system or both the alert produced by monitoring the deployed operation of the software system and the recent alert in the history of one or more generated alerts generated during the static and dynamic testing of code of the software system.

7. The method of claim 6, wherein matching the first performance and security information relating to the software system generated during the development of the software system with the second performance and security information relating to the software system generated during the deployed operation of the software system to determine the one or more performance and security alerts to escalate further comprises:

matching the root cause of the alert produced by monitoring the deployed operation of the software system with the recent alert in the history of one or more generated alerts generated during the static and dynamic testing of code of the software system based on at least one of one or more similar log-sequences and one or more log-groups and is performed using one or more machine learning techniques;

matching one or more unit-test error handling logs of alerts generated during the static and dynamic testing of code of the software system with one or more monitor alerts produced by monitoring the deployed operation of the software system by examining the one or more application logs using a recent time window, searching for one or more matches with known log-signatures of problems, and upon finding at least one match, escalating a severity of the alert produced by monitoring the deployed operation of the software system; and     associating information relating to the one or more monitor alerts produced by monitoring the deployed operation of the software system with source code causing the one or more generated alerts generated during the static and dynamic testing of code of the software system.

8. A system comprising a processor, a memory accessible by the processor, and computer program instructions stored in the memory and executable by the processor to perform:

generating a first performance and security information relating to a software system during a development of the software system, wherein generating the first performance and security information relating to the software system during the development of the software system comprises performing a static and dynamic testing of code of the software system during the development of the software system to generate a history of one or more generated alerts;

generating a second performance and security information relating to the software system during a deployed operation of the software system;

matching the first performance and security information relating to the software system generated during the development of the software system with the second performance and security information relating to the software system generated during the deployed operation of the software system to determine one or more performance and security alerts to escalate; and     reporting the one or more escalated performance and security alerts.

9. The system of claim 8, wherein generating the first performance and security information relating to the software system during the development of the software system further comprises at least one of:

performing a first dynamic testing of one or more subsystems of code of the software system during the development of the software system to generate one or more application logs for the one or more generated alerts; and     performing a second dynamic testing of one or more units of code of the software system during the development of the software system to generate one or more error-handling logs for the one or more generated alerts.

10. The system of claim 9, further comprising associating each generated alert of the one or more generated alerts with an immediate log-sequence using one or more generated call graphs representing one or more calling relationships between routines in the software system.

11. The system of claim 10, wherein generating the second performance and security information relating to the software system during the deployed operation of the software system comprises monitoring the deployed operation of the software system and collecting one or more monitor alerts produced by monitoring the deployed operation of the software system.

12. The system of claim 11, wherein generating the second performance and security information relating to the software system during the deployed operation of the software system comprises collecting at least one of an information regarding one or more configuration changes and one or more produced alerts regarding the one or more configuration changes and the matching comprises matching the collected information regarding at least one of the one or more configuration changes and the one or more produced alerts regarding the one or more configuration changes with the second performance and security information relating to the software system generated during the deployed operation of the software system to determine a performance and the one or more performance and security alerts to escalate.

13. The system of claim 11, wherein matching the first performance and security information relating to the software system generated during the development of the software system with the second performance and security information relating to the software system generated during the deployed operation of the software system to determine the one or more performance and security alerts to escalate comprises:

determining a root cause of an alert produced by monitoring the deployed operation of the software system using the history of one or more generated alerts generated during the static and dynamic testing of code of the software system; and     responsive to the root cause of the alert produced by monitoring the deployed operation of the software system matches a recent alert in the history of one or more generated alerts generated during the static and dynamic testing of code of the software system, escalating the alert produced by monitoring the deployed operation of the software system or both the alert produced by monitoring the deployed operation of the software system and the recent alert in the history of one or more generated alerts generated during the static and dynamic testing of code of the software system.

14. The system of claim 13, wherein matching the first performance and security information relating to the software system generated during the development of the software system with the second performance and security information relating to the software system generated during the deployed operation of the software system to determine the one or more performance and security alerts to escalate further comprises:
  matching the root cause of the alert produced by monitoring the deployed operation of the software system with the recent alert in the history of one or more generated alerts generated during the static and dynamic testing of code of the software system based on at least one of one or more similar log-sequences and one or more log-groups and is performed using one or more machine learning techniques;
  matching one or more unit-test error handling logs of alerts generated during the static and dynamic testing of code of the software system with one or more monitor alerts produced by monitoring the deployed operation of the software system by examining the one or more application logs using a recent time window, searching for one or more matches with known log-signatures of problems, and upon finding at least one match, escalating a severity of the alert produced by monitoring the deployed operation of the software system; and
  associating information relating to the one or more monitor alerts produced by monitoring the deployed operation of the software system with source code causing the one or more generated alerts generated during the static and dynamic testing of code of the software system.

15. A computer program product comprising a non-transitory computer readable storage medium having program instructions embodied therewith, the program instructions executable by a computer, to cause the computer to perform a method comprising:
  generating a first performance and security information relating to a software system during a development of the software system, wherein generating the first performance and security information relating to the software system during the development of the software system comprises performing a static and dynamic testing of code of the software system during the development of the software system to generate a history of one or more generated alerts;
  generating a second performance and security information relating to the software system during a deployed operation of the software system;
  matching the first performance and security information relating to the software system generated during the development of the software system with the second performance and security information relating to the software system generated during the deployed operation of the software system to determine one or more performance and security alerts to escalate; and
  reporting the one or more escalated performance and security alerts.

16. The computer program product of claim 15, wherein generating the first performance and security information relating to the software system during the development of the software system further comprises at least one of:
  performing a first dynamic testing of one or more subsystems of code of the software system during the development of the software system to generate one or more application logs for the one or more generated alerts; and
  performing a second dynamic testing of one or more units of code of the software system during the development of the software system to generate one or more error-handling logs for the one or more generated alerts.

17. The computer program product of claim 16, further comprising associating each generated alert of the one or more generated alerts with an immediate log-sequence using one or more generated call graphs representing one or more calling relationships between routines in the software system.

18. The computer program product of claim 17, wherein generating the second performance and security information relating to the software system during the deployed operation of the software system comprises collecting at least one of an information regarding one or more configuration changes and one or more produced alerts regarding the one or more configuration changes and the matching comprises matching the collected information regarding at least one of the one or more configuration changes and the one or more produced alerts regarding the one or more configuration changes with the second performance and security information relating to the software system generated during the deployed operation of the software system to determine a performance and the one or more performance and security alerts to escalate.

19. The computer program product of claim 18, wherein matching the first performance and security information relating to the software system generated during the development of the software system with the second performance and security information relating to the software system generated during the deployed operation of the software system to determine the one or more performance and security alerts to escalate comprises:
  determining a root cause of an alert produced by monitoring the deployed operation of the software system using the history of one or more generated alerts generated during the static and dynamic testing of code of the software system; and
  responsive to the root cause of the alert produced by monitoring the deployed op eration of the software system matches a recent alert in the history of one or more generated alerts generated during the static and dynamic testing of code of the software system, escalating the alert produced by monitoring the deployed operation of the software system or both the alert produced by monitoring the deployed operation of the software system and the recent alert in the history of one or more generated alerts generated during the static and dynamic testing of code of the software system.

20. The computer program product of claim 19, wherein matching the first performance and security information relating to the software system generated during the development of the software system with the second performance and security information relating to the software system generated during the deployed operation of the software system to determine the one or more performance and security alerts to escalate further comprises:
  matching the root cause of the alert produced by monitoring the deployed operation of the software system with the recent alert in the history of one or more generated alerts generated during the static and dynamic testing of code of the software system based on at least one of one or more similar log-sequences and one or more log-groups and is performed using one or more machine learning techniques;

matching one or more unit-test error handling logs of alerts generated during the static and dynamic testing of code of the software system with one or more monitor alerts produced by monitoring the deployed operation of the software system by examining the one or more application logs using a recent time window, searching for one or more matches with known log-signatures of problems, and upon finding at least one match, escalating a severity of the alert produced by monitoring the deployed operation of the software system; and associating information relating to the one or more monitor alerts produced by monitoring the deployed operation of the software system with source code causing the one or more generated alerts generated during the static and dynamic testing of code of the software system.

\* \* \* \* \*